US008845250B1

(12) United States Patent
Helms

(10) Patent No.: US 8,845,250 B1
(45) Date of Patent: Sep. 30, 2014

(54) TIE DOWN ANCHOR APPARATUS AND METHOD

(71) Applicant: Steven Helms, Mill Creek, WA (US)

(72) Inventor: Steven Helms, Mill Creek, WA (US)

(*) Notice: Subject to any disclaimer, the term of this patent is extended or adjusted under 35 U.S.C. 154(b) by 0 days.

(21) Appl. No.: 13/998,366

(22) Filed: Oct. 26, 2013

Related U.S. Application Data

(60) Provisional application No. 61/795,841, filed on Oct. 26, 2012.

(51) Int. Cl.
*B61D 45/00* (2006.01)
*B60P 7/08* (2006.01)

(52) U.S. Cl.
CPC .................................. *B60P 7/0807* (2013.01)
USPC ....................................................... 410/106

(58) Field of Classification Search
USPC .................. 410/101, 106, 108, 109, 110, 115
See application file for complete search history.

(56) References Cited

U.S. PATENT DOCUMENTS

| 1,535,128 | A | * | 4/1925 | Nugent | 296/43 |
|---|---|---|---|---|---|
| 3,421,726 | A | | 1/1969 | Getter | |
| 3,841,660 | A | | 10/1974 | Clark | |
| 3,950,010 | A | | 4/1976 | Robertson | |
| 4,191,108 | A | * | 3/1980 | Jones | 410/110 |
| 4,248,558 | A | | 2/1981 | Lechner | |
| D283,006 | S | * | 3/1986 | Carter, Jr. | D8/349 |
| 4,607,991 | A | | 8/1986 | Porter | |
| 4,915,556 | A | * | 4/1990 | Unger | 410/110 |
| D319,571 | S | * | 9/1991 | Bennett et al. | D8/356 |
| 5,051,047 | A | * | 9/1991 | Loncaric | 410/77 |
| 5,141,277 | A | * | 8/1992 | Alexander | 296/43 |
| D332,389 | S | * | 1/1993 | Dinges | D8/356 |
| 5,443,341 | A | | 8/1995 | Hamilton | |
| 5,662,375 | A | * | 9/1997 | Adams et al. | 296/214 |
| 5,676,508 | A | | 10/1997 | Weicht | |
| 5,915,900 | A | | 6/1999 | Boltz | |
| 6,416,265 | B1 | * | 7/2002 | Flores et al. | 410/106 |
| 6,464,437 | B1 | | 10/2002 | Elwell | |
| 6,565,301 | B1 | | 5/2003 | Lin | |
| 7,481,610 | B1 | | 1/2009 | Egigian | |
| 2007/0183860 | A1 | | 8/2007 | Smith | |

* cited by examiner

*Primary Examiner* — H Gutman
(74) *Attorney, Agent, or Firm* — William Forster

(57) ABSTRACT

A tie-down anchor for insertion into a stake opening in the sidewall of the bed of a pick-up truck. The tie-down anchor is constructed for releasable engagement with the sidewall, and arranged for receiving and releasably engaging at least one tie-down line. The tie-down anchor comprises a continuous, elongate flexible frame having first and second side members extending apart from a common transition point. The tie-down anchor is moveable from a first position, disengaged from a pick-up truck sidewall, to a second position, disposed through a stake opening, engaged with the pick-up truck sidewall.

19 Claims, 4 Drawing Sheets

TIE DOWN ANCHOR APPARATUS AND METHOD

This application claims the benefit of U.S. Provisional Application No. 61/795,841

BACKGROUND

This invention relates generally to tie-down apparatus arranged for vehicles including pick-up trucks having stake openings disposed in the bed sidewalls thereof.

Tie-down anchors arranged for insertion into a stake opening to engage the sidewall of a pick-up truck are common and well known. Examples include U.S. Pat. No. 4,191,108 issued in 1980, and U.S. Pat. No. 4,607,991 issued in 1986 that illustrate tie-downs constructed entirely of metal that are bent or stamped into their final shape.

However, tie-down anchors manufactured of modern materials, including plastics, that are molded require special engineered configurations to make them functionally and economically practical.

Accordingly, a need remains for a tie-down anchor arranged to take advantage of modern techniques in plastic manufacturing.

SUMMARY OF THE INVENTION

One object of the present invention is to increase the efficiency in the manufacture of tie-down anchors.

A second object is to reduce the costs associated with manufacturing tie-down anchors.

Another object is improve the ease with which a tie-down can be installed in a stake opening.

Yet another object is simplify the procedure to secure cargo in the bed of a pick-up truck.

A further object is to allow a user to employ common materials to secure cargo in a pick-up truck.

Still another object is to improve the safety of transporting cargo in a pick-up truck The invention is a tie-down anchor arranged for insertion into a stake opening that is formed in the sidewall of the bed of a pick-up truck. The tie-down anchor being arranged for releasable engagement with the sidewall, and for receiving and releasably engaging at least one tie-down line.

In one embodiment, the tie-down anchor comprises a continuous, elongate and generally planar flexible frame defined by first and second side members. Each side member extends from a common transition point, and each side member diverging from the other to form an inner surface on each side member, and an outer surface on each side member.

Further, the first side member includes a first end that defines means for attaching at least one tie-down line, and similarly, the second side member includes a second end that defines means for attaching at least one tie-down line.

Importantly, the tie-down anchor is moveable from a first uncompressed, unbiased position, disengaged from the stake opening, to a second compressed, biased position, for insertion through a stake opening to engaged the bed sidewall.

In addition, a locking means is disposed on the outer surface of each side member to releasably secure the tie-down anchor within the stake opening to the bed sidewall.

Finally, the flexible frame is formed to define a reinforcing means incorporated into each side member which could include a reinforcing rib disposed on the surface of each side member, or an endless reinforcing edge-band that defines an endless perimeter of the frame, or a combination of the two.

In another embodiment, the locking means of the tie-down anchor comprises a projection, on the outer surface of each side member, that defines a seat formed to engage a portion of the bed sidewall when the tie-down anchor is moved from the first unbiased position, disengaged from the stake opening, to the second biased position, engaged within the stake opening, against the bed sidewall.

In another embodiment, each side member comprises at least one reinforcing rib that runs from the first end to the second end, the reinforcing rib being disposed between portions of the endless reinforcing edge-band.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention.

DETAILED DESCRIPTION OF PREFERRED EMBODIMENT

Figure 1:
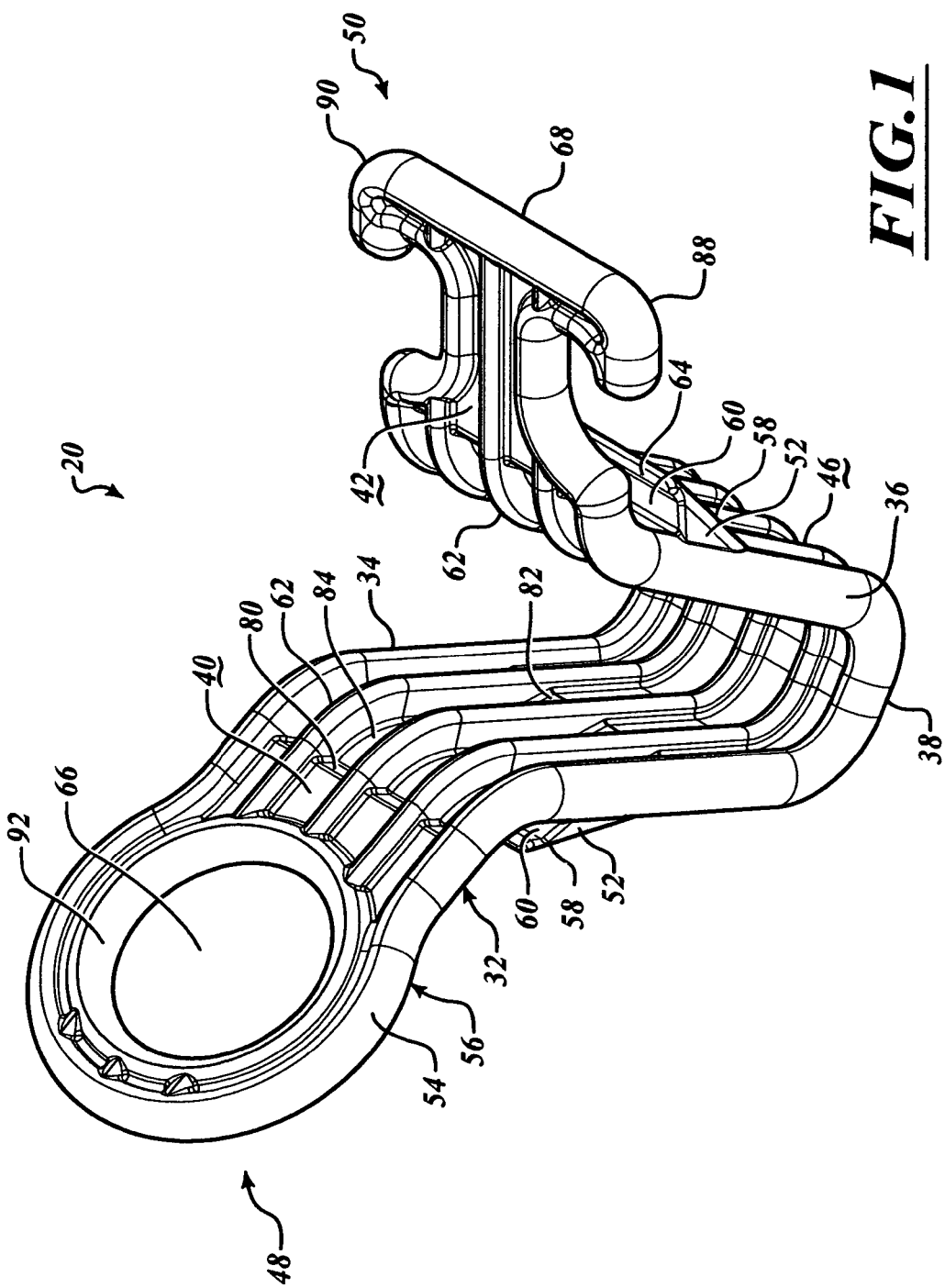
FIG. 1 is a perspective view of a tie-down anchor.

FIGS. 1 through 4 show an embodiment of a tie-down anchor 20 arranged for releasable engagement with a stake opening 22 that is formed in the sidewall 24 of the bed 26 of a pick-up truck 28. The tie-down anchor 20 is arranged and constructed to receive at least one tie-down line 30.

In one embodiment, the tie-down anchor 20 comprises a continuous, elongate and generally planar flexible frame 32 defined by first and second side members 34-36. Each side member 34-36 extends from a common transition point 38 to form a wedge or V-shaped structure, each side member 34-36 diverges from the other to form an inner surface 40-42 on each side member 34-36, and an outer surface 44-46 on each side member 34-36.

Further, the first side member 34 includes a first end 48 that defines means for attaching at least one tie-down line, and similarly, the second side member 36 includes a second end 50 that defines means for attaching at least one tie-down line. As will be seen, means for attaching a tie-down line to the first end 48 is an integrally formed aperture 66, and similarly means for attaching a tie-down line to the second end 50 is a T structure 68.

Figure 3:
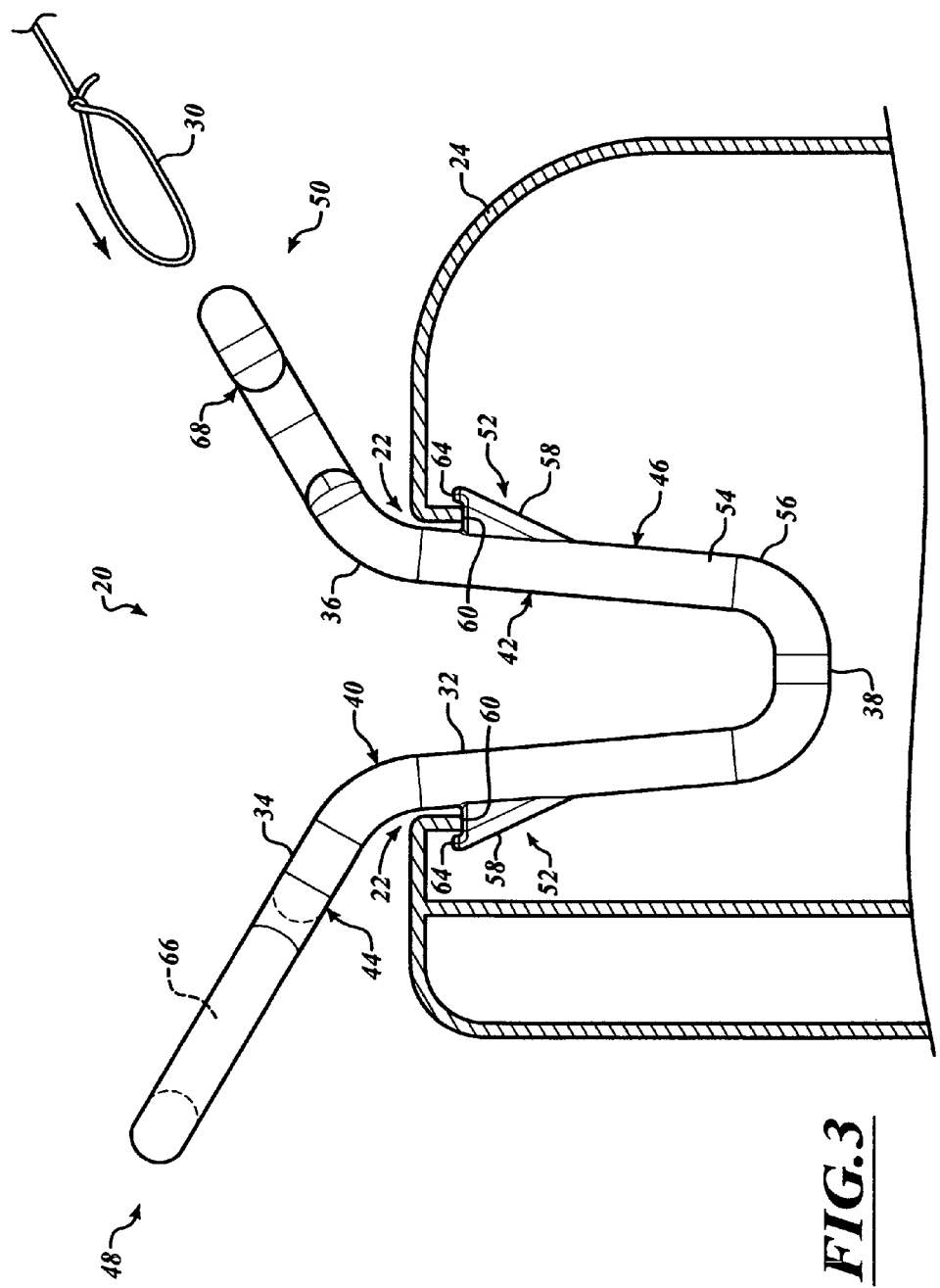
FIG. 3 Is a side elevation view of a tie-down anchor received through a stake opening located in the sidewall a pick-up truck bed, wherein portions of the sidewall are broken away to help illustrate the engagement of the anchor with the stake opening.

Importantly, the tie-down anchor 20 is moveable from a first uncompressed, unbiased position, as illustrated in FIG. 1, disengaged from the stake opening, to a second compressed, biased position, for placement into a stake opening 22 as illustrated in FIG. 3, engaged against the bed sidewall 24.

In addition, a locking means 52 is disposed on the outer surface of each side member 34-36 to releasably secure the tie-down anchor 20 within the stake opening 22. For this purpose, locking means 52 comprises a seat 60 with a integrally formed lip 64 extending upward on the most outward portion of the seat 60.

Moreover, for added strength and stability, the flexible frame 32 is formed to define an endless reinforcing edge-band 54 that defines an endless perimeter 56 of the first and second side members 34-36 that comprise frame 32.

Considering now in more detail the components from which a tie-down anchor 20 is constructed, the preferred embodiment includes a locking means 52 which comprises a projection 58, on the outer surface of each side member 34-36, that defines a seat 60 formed to engage a portion of the bed sidewall 24 when the tie-down anchor 20 is moved from the first unbiased position, disengaged from the stake opening 22, to the second biased position, for engagement within the stake opening 22, against the sidewall 24. In addition, a preferred embodiment is constructed such that each side member 34-36 comprises at least one reinforcing rib 62 that runs from the first end 48 to the second end 50, the reinforcing rib 62 being disposed between portions of the endless reinforcing edge-band 54.

More specifically, the frame 32 of the tie-down anchor 20 is typically constructed of plastic. Because of this, the most economical configuration requires that the frame have a variable thickness to provide more material where reinforcing is required for strength. Accordingly, the frame 32 includes a reinforced edge-band 54 that defines the perimeter 56. Also, as described above, at least one reinforcing rib 62 is typical. However, as illustrated in FIG. 1, a plurality of reinforcing ribs 62 can be provided.

Turing now to FIG. 3, the construction of a projection 58 is illustrated. Typically, projection 58 is integrally formed on each side member 34-36 as material extending outward to form a seat 60. As can be seen, the boundary of seat 60 is formed by a lip 64 that extends generally upward. In this way, the tie-down anchor 20 is secured when it is in the second position within the stake opening 22.

Directing attention to FIG. 1, each end 48-50 of each side member 34-36 is configured differently. Specifically, first end 48 is constructed to form an aperture 66, and second end 50 is configured to form a T 68. Accordingly, the user is provided with more than one option to tether a tie-down line 30 to the tie-down anchor 20. In addition, T 68 comprises opposing arms 88-90 extending outward to provide a structure for receiving as securing a tie-down line 30

Figure 4:
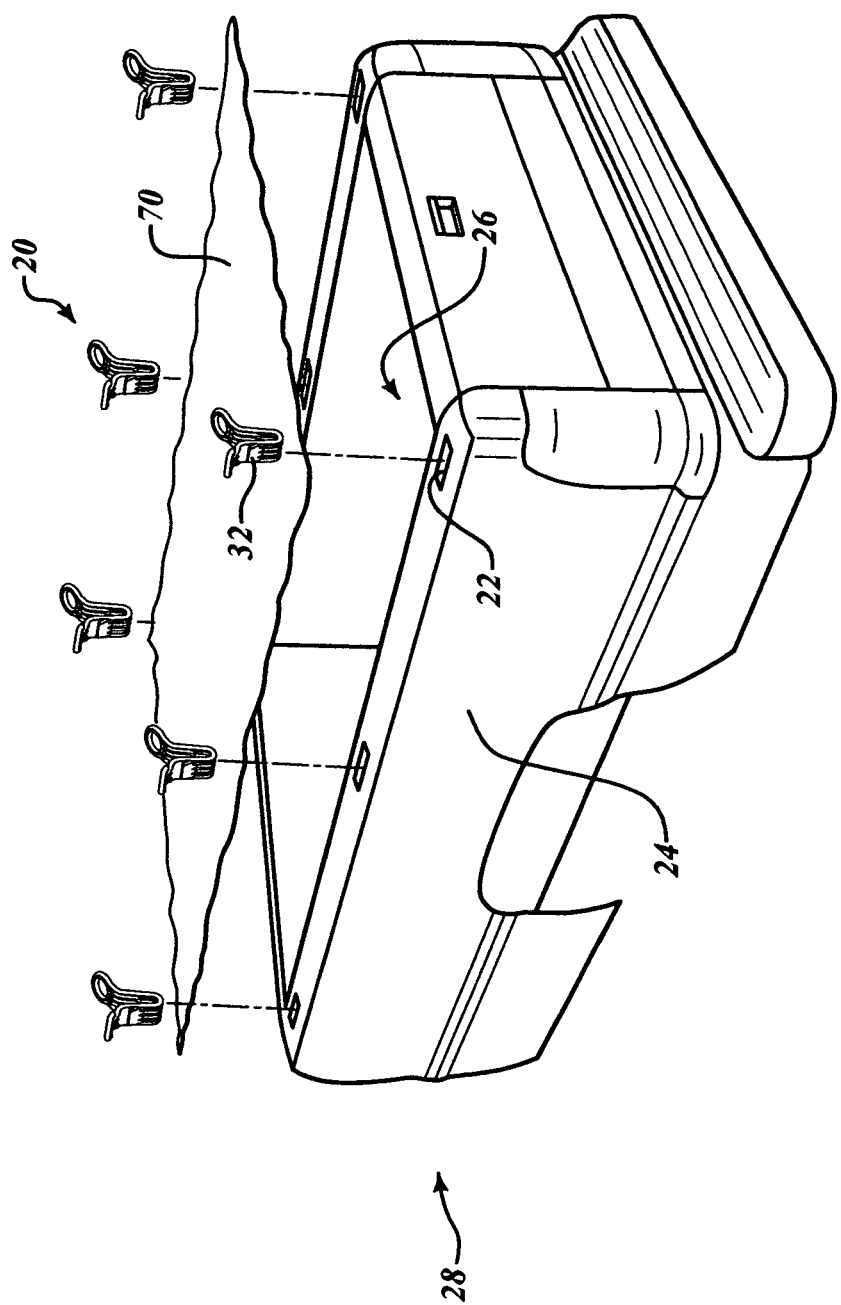
FIG. 4 is an exploded view illustrating a tarp being held in position over the bed of a pick-up truck by a plurality of tie-down anchors.

Alternatively, as illustrated in FIG. 4, the tie-down anchor 20 can be employed to secure a tarp 70, to cover the bed 26 of a pick-up truck 28. For this purpose, a plurality of tie-down anchors 20 are provided, one in each stake opening 22, to urge a portion of a tarp 70 into the stake opening 22.

Turning again to FIG. 1, a preferred embodiment tie-down anchor 20 is illustrated as including a plurality of reinforcing ribs 62 that are formed on the inner surface 40-42, and outer surface 44-46, of each side member 34-36. Importantly, the reinforcing ribs 62 are provided to strengthen the tie-down anchor 20 while minimizing the amount of material employed to form the tie down anchor 20. Importantly, it would be impractical to manufacture a tie-down anchor 20 from plastic material of uniform thickness with sufficient strength to sustain heavy loads.

Accordingly, a preferred embodiment includes a plurality reinforcing ribs 62, and a similarly constructed endless reinforcing edge-band 54 that defines perimeter 56. The reinforcing ribs 62 are disposed on each surface, between the outside boundaries defined by the perimeter 56. For example, on the inner surfaces 40-42, the reinforcing ribs 62 extend from the transition point 38, defined by that point or intersection at which the first and second side members 34-36 are joined, to the respective first and second ends 48-50, which are defined by that portion of the side members arranged to engage a tie-down line 30.

Similarly, the a plurality of reinforcing ribs 62 are formed on the outer surfaces 44-46, extending from the transition point 38 to a projection 58 which is located adjacent the first and second ends 48-50. In the preferred embodiment, the reinforcing ribs 62, on the inner and outer surfaces 40-42 are spaced equally from the perimeter 56 and as a result are aligned, accordingly, each reinforcing rib on an inner surface corresponds to a reinforcing rib on the outer surface.

Figure 2:
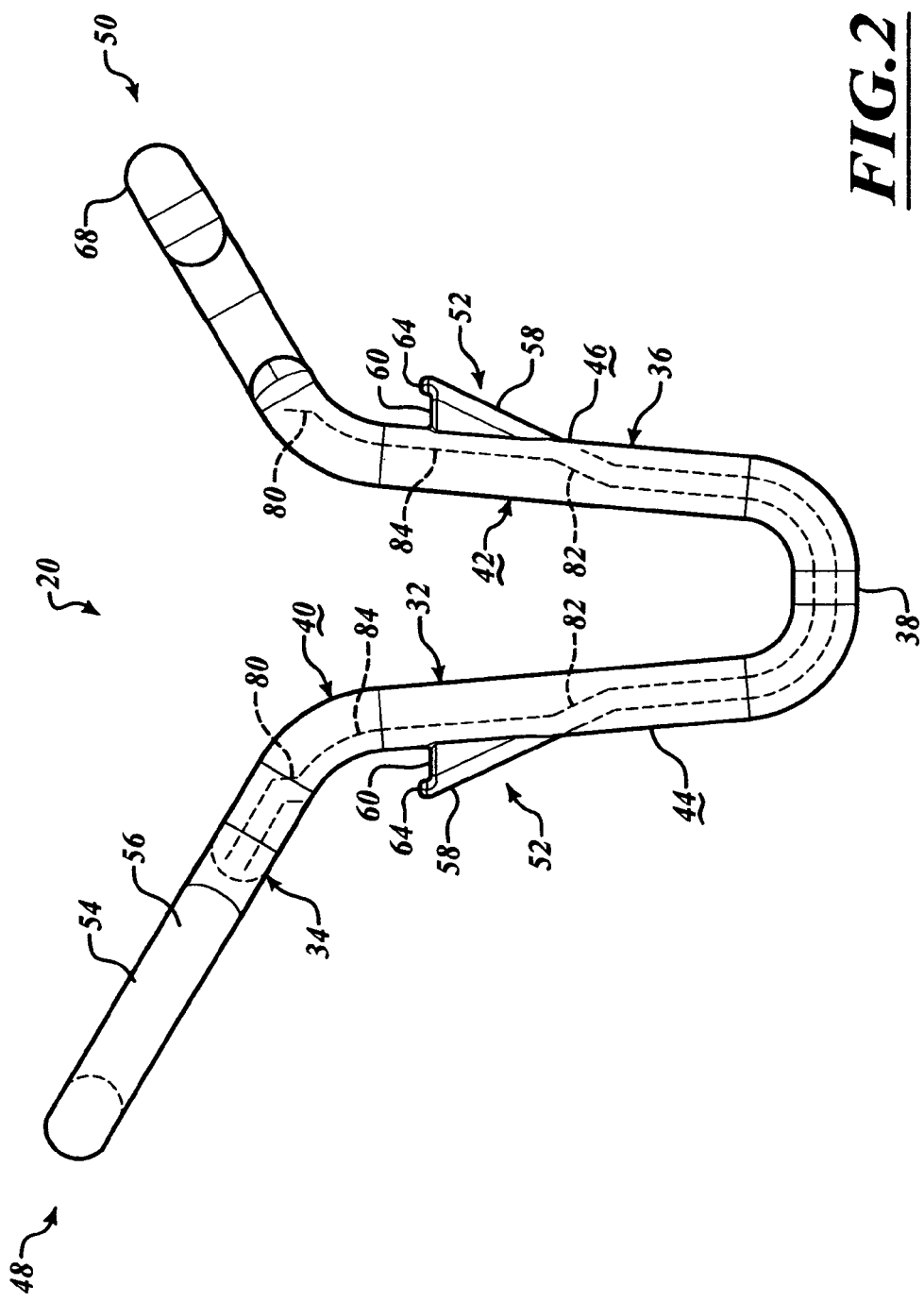
FIG. 2 is a side elevation view of a tie-down anchor.

Beyond this, a preferred embodiment includes an upper step 80 and a lower spaced-apart corresponding lower step 82 disposed between each reinforcing rib 62 on the inner surfaces 40-42. With this construction, a recessed region 84 is formed that is slightly offset as best illustrated in FIG. 1, and FIG. 2 where hidden lines indicate the offset or recessed region 84. It should be noted that this type of construction promotes the manufacturing process employed to mass produce parts from plastic resins.

Finally, another feature of a preferred embodiment, incorporates flared ends, i.e., each first and second end 48-50 extend outward in opposing directions. This construction tends to align the respective end with the forces imposed by a taught tie-down line.

In the drawings and specifications there have been set forth preferred embodiments of the invention and although specific terms are employed, they are used in a generic and descriptive sense only and not for purposes of limitation. The design of the hose valve depicted in this invention combine several functions, that of sealing, restraining and wear reduction, into one device or mechanism. Separate devices or mechanisms could be used for each function. Other devices or mechanisms could be used to achieve the functions and results.

In addition, whereas the drawings and specifications relate to central vacuum cleaning systems for a home or building, the application is not limited to this industry alone but to any industry or operation where a vacuum system is used.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A tie-down anchor for insertion into a stake opening defined in the sidewall of the bed of a pick-up truck, the tie-down anchor arranged for releasable engagement with the sidewall, and arranged for receiving and releasably engaging at least one tie-down line, the tie-down anchor comprising:
   a continuous, elongate flexible frame defined by first and second side members extending apart from a common transition point, each side member defining an inner surface and an outer surface;
   the first side member having a first end, spaced apart from the transition point, the first end defining means for releasably receiving and securing at least one tie-down line, and the second side member having a second end, spaced apart from the transition point, the second side member defining means for releasably receiving and securing at least one tie-down line;
   locking means disposed on the outer surface of each side member to releasably secure the tie-down anchor, within a stake opening, to the sidewall of a pick-up truck, the tie-down anchor being moveable from a first unbiased position, disengaged from a pick-up truck sidewall, to a second biased position, for placement into a stake opening, to engage with the pick-up truck sidewall; and wherein the inner surface of the first side member defines at least one reinforcing rib extending from the transition point to the first end, and the inner surface of the second side defines at least one reinforcing rib extending from the transition point to the second end.

2. A tie-down anchor as recited in claim 1 wherein the frame further comprises a raised endless edge-band integrally formed to reinforce and define the perimeter of the first and second side members of the frame.

3. A tie-down anchor as recited in claim 2 wherein the first end defines an aperture to receive and secure a tie-down line.

4. A tie-down anchor as recited in claim 3 wherein the second end defines at least two arms disposed to extend in opposing directions to receive and secure a tie-down line.

5. A tie-down anchor as recited in claim 4 wherein the outer surface of the first side member defines at least one reinforcing rib extending from the transition point to the locking means, and the outer surface of the second side member defines at least one reinforcing rib extending substantially from the transition point to the locking means.

6. A tie-down anchor as recited in claim 2 wherein the outer surface of the first side member defines at least one reinforcing rib extending from the transition point to the locking means, and the outer surface of the second side member defines at least one reinforcing rib extending substantially from the transition point to the locking means.

7. A tie-down anchor as recited in claim 1 wherein the outer surface of the first side member defines at least one reinforcing rib extending from the transition point to the locking means, and the outer surface of the second side member defines at least one reinforcing rib extending substantially from the transition point to the locking means.

8. A tie-down anchor as recited in claim 7 wherein each locking means defines a seat arranged to engage the sidewall of a pick-up truck to prevent disengagement of the tie-down anchor from the sidewall.

9. A tie-down anchor as recited in claim 8 wherein the inner surface of the first side member defines an upper step disposed adjacent the first end, and a lower step disposed adjacent the transition point spaced apart to create an offset or recessed region between the upper and lower step, and the inner surface of the second side member defines an upper step disposed adjacent the second end, and a lower step disposed adjacent the transition point spaced apart to create an offset or recessed region between the upper and lower step.

10. A tie-down anchor for insertion into a stake opening defined in the sidewall of the bed of a pick-up truck, the tie-down anchor arranged for releasable engagement with the sidewall, and arranged for receiving and releasably engaging at least one tie-down line, the tie-down anchor comprising:

a continuous, elongate flexible frame defined by first and second side members extending apart from a common transition point, each side member defining an inner surface and an outer surface;

the first side member having a first end, spaced apart from the transition point, the first end defining means for releasably receiving and securing at least one tie-down line, and the second side member having a second end, spaced apart from the transition point, the second side member defining means for releasably receiving and securing at least one tie-down line;

locking means disposed on the outer surface of each side member to releasably secure the tie-down anchor, within a stake opening, to the sidewall of a pick-up truck, the tie-down anchor being moveable from a first unbiased position, disengaged from a pick-up truck sidewall, to a second biased position, for placement into a stake opening, to engage with the pick-up truck sidewall; and wherein the frame further comprises a raised endless edge-band integrally formed to reinforce and define the perimeter of the first and second side members of the frame.

11. A tie-down anchor as recited in claim 10 wherein the inner surface of the first side member defines a plurality of space apart reinforcing ribs extending from the transition point to the first end, and the inner surface of the second side defines a plurality of spaced apart reinforcing ribs extending from the transition point to the second end.

12. A tie-down anchor as recited in claim 11 wherein the inner surface of the first side member defines an upper step disposed between each reinforcing rib, adjacent the first end, and a corresponding lower step disposed between each reinforcing rib, adjacent the transition point, spaced apart to create an offset recessed region between each corresponding upper and lower step, and the inner surface of the second side member defines an upper step disposed between each reinforcing rib, adjacent the second end, and a corresponding lower step disposed between each reinforcing rib, adjacent the transition point, spaced apart to create an offset recessed region between each corresponding upper and lower step.

13. A tie-down anchor as recited in claim 12 wherein the outer surface of the first side member defines a plurality of spaced apart reinforcing ribs extending from the transition point to the locking means disposed on the outer surface of the first side member, and the outer surface of the second side defines a plurality of spaced apart reinforcing ribs extending from the transition point to the locking means disposed on the outer surface of the second side member.

14. A tie-down anchor as recited in claim 11 wherein the outer surface of the first side member defines a plurality of spaced apart reinforcing ribs extending from the transition point to the locking means disposed on the outer surface of the first side member, and the outer surface of the second side defines a plurality of spaced apart reinforcing ribs extending from the transition point to the locking means disposed on the outer surface of the second side member.

15. A method for making a tie-down anchor for insertion into a stake opening defined in the sidewall of the bed of a pick-up truck, the tie-down anchor arranged for releasable engagement with the sidewall, and arranged for receiving and releasably engaging at least one tie-down line, the method comprising the steps:

forming a continuous, elongate flexible frame defined by first and second side members extending apart from a common transition point, each side member defining an inner surface and an outer surface, the first side member having a first end, spaced apart from the transition point, the first end defining means for releasably receiving and securing at least one tie-down line, and the second side member having a second end, spaced apart from the transition point, the second side member defining means for releasably receiving and securing at least one tie-down line;

incorporating locking means on the outer surface of each side member to releasably secure the tie-down anchor, within a stake opening, to the sidewall of a pick-up truck, the tie-down anchor being moveable from a first unbiased position, disengaged from a pick-up truck sidewall, to a second biased position, for placement into a stake opening, to engage with the pick-up truck sidewall; and forming the inner surface of the first side member to define at least one reinforcing rib extending from the transition point to the first end, and forming the inner surface of the second side defines at least one reinforcing rib extending from the transition point to the second end.

16. A method for making a tie-down anchor as recited in claim 15 further comprising the step of integrating a raised endless edge-band to reinforce and define the perimeter of the first and second side members of the frame.

17. A method for making a tie-down anchor as recited in claim 16 wherein the inner surface of the first side member defines an upper step disposed between each reinforcing rib, adjacent the first end, and a corresponding lower step disposed between each reinforcing rib, adjacent the transition point, spaced apart to create an offset recessed region between each corresponding upper and lower step, and the inner surface of the second side member defines an upper step disposed between each reinforcing rib, adjacent the second end, and a corresponding lower step disposed between each reinforcing rib, adjacent the transition point, spaced apart to create an offset recessed region between each corresponding upper and lower step.

18. A method for making a tie-down anchor as recited in claim 17 further comprising the step of defining an aperture at the first end to secure a tie-down line, and defining opposing arms at the second end, extending to secure a tie-down line.

19. A method for making a tie-down anchor as recited in claim 18 further comprising the step of incorporating locking means defining a seat arranged to engage the sidewall of a pick-up truck to prevent disengagement of the tie-down anchor from the sidewall.

* * * * *